Oct. 7, 1958   G. T. GRAVES   2,855,069
LUBRICATING SYSTEM AND FLOW REVERSING VALVE
Filed June 22, 1955   2 Sheets-Sheet 1

INVENTOR.
GEORGE T. GRAVES
BY
Oberlin & Limbach
ATTORNEYS

Oct. 7, 1958     G. T. GRAVES     2,855,069
LUBRICATING SYSTEM AND FLOW REVERSING VALVE
Filed June 22, 1955     2 Sheets-Sheet 2

INVENTOR.
GEORGE T. GRAVES
BY
Oberlin + Limbach
ATTORNEYS.

United States Patent Office 2,855,069
Patented Oct. 7, 1958

2,855,069

LUBRICATING SYSTEM AND FLOW REVERSING VALVE

George T. Graves, Walton Hills, Ohio, assignor to The Farval Corporation, Cleveland, Ohio, a corporation of Ohio Application June 22, 1955, Serial No. 517,140

13 Claims. (Cl. 184—7)

This invention relates as indicated to a lubricating system and a hydraulic flow reversing valve, and more particularly to a valve of the type indicated particularly suitable for employment in lubricating systems for machinery and the like.

Various types of lubricating systems are now in use for supplying lubricants such as grease or oil to the bearings of many types of machinery such as mill stands, tables and coilers of hot strip mills, shears and punches and the like. An example of a special measuring valve adapted to be employed in such systems to dispense predetermined amounts of lubricant to a bearing is disclosed in Patent No. 2,016,372 to Aaron J. Jennings. In a system employing valves of this type, two parallel lubricant supply lines are provided together with a pump designed alternately to supply lubricant under pressure to each of such lines. The lubricant measuring or dispensing valves of the type above referred to will force a desired amount of lubricant into the bearing each time one of such lines is put under pressure.

In Patent No. 2,600,178 to G. H. Acker, there is disclosed a novel pump and control means associated therewith whereby lubricant or other fluid may be thus alternately directed under pressure to such supply lines at selected time intervals. The mechanism disclosed and claimed in such prior Acker patent is furthermore so designed that the pump may operate continuously even when no fluid is permitted to enter one of the supply lines.

The valve means employed in hydraulic systems of this type and particularly lubricant dispensing systems for the purpose of thus alternately directing the fluid received under pressure from the pump to the respective supply lines has tended in the past to be rather expensive of construction if trouble-free operation is to be ensured. Inasmuch as the most important feature of lubricating systems of this type is their reliable automatic operation, the various moving parts require to be carefully machined, finished and fitted. In the case of large complex and expensive machinery, the installation of an automatic or semi-automatic lubricating system is easily justified since failure properly to lubricate one of the bearings may result in serious damage to the mechanism and to very large charges while the machine is shut down for repairs. In the case of smaller and less expensive equipment, however, the owner may be less inclined to invest in a relatively expensive lubricating system and may instead prefer to rely on more or less haphazard manual lubrication.

It is accordingly a principal object of this invention to provide a novel hydraulic flow reversing valve of relatively simple and inexpensive construction suitable for employment in automatic or semi-automatic lubricating systems where only a relatively small number of lubricating valves require to be served thereby.

It is a further object to provide such reversing valve and associated lubricating system which is compact and inexpensive but effective to ensure proper operation of a limited number of lubricating valves contained in a restricted area where the conduit lengths do not produce severe frictional pressure drop.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1A is a fragmentary diagrammatic view showing a modification;

Figure 1:
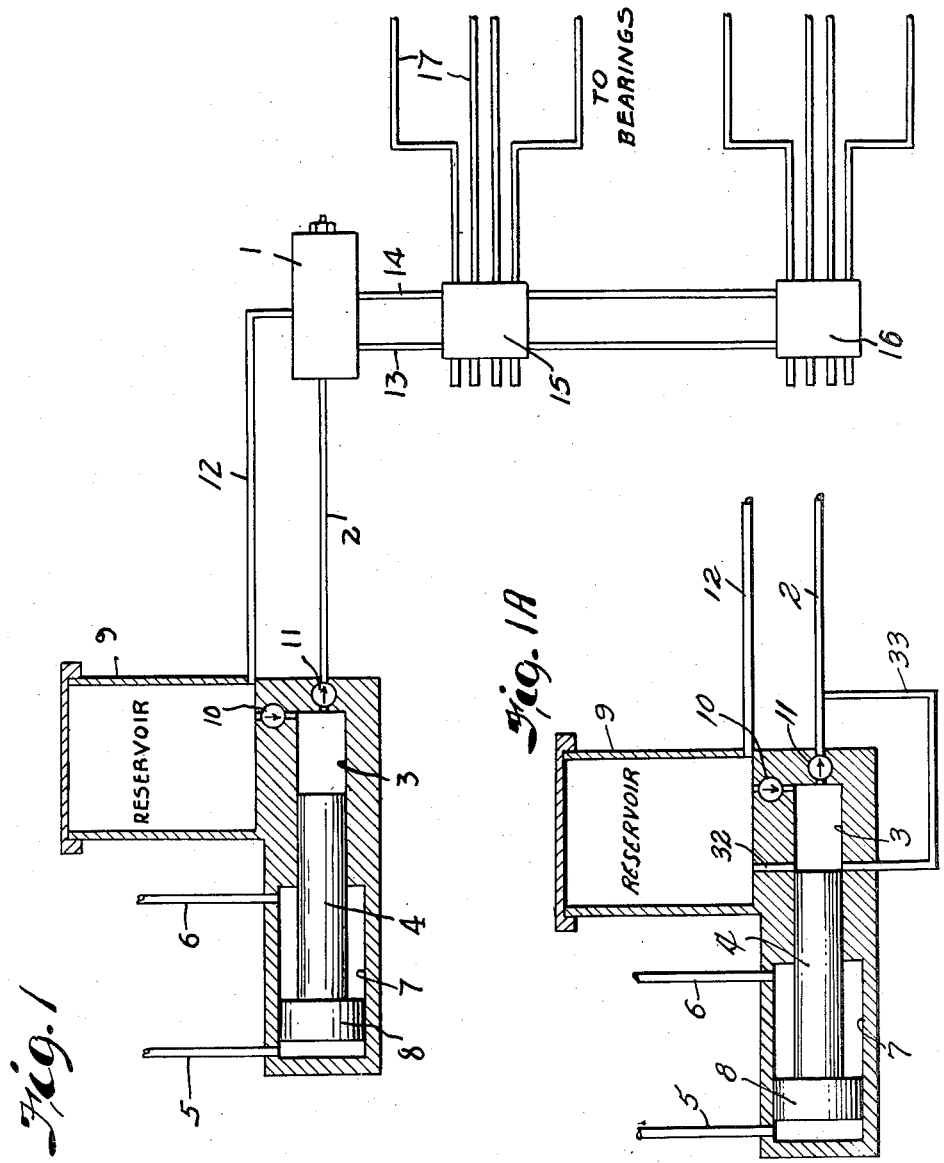
Fig. 1 is a general diagrammatic view of a fluid pressure system including my new hydraulic flow reversing valve.

Referring now more particularly to such drawing and especially Fig. 1 thereof, my new reversing valve 1 is connected directly to the discharge pressure line 2 leading from a single stroke pump of relatively substantial displacement. Such pump may comprise a pumping chamber or cylinder 3 in which piston 4 is adapted to be reciprocated through the action of fluid pressure introduced alternately through lines 5 and 6 to the respective ends of large cylinder 7 in which piston head 8 fits. Such pump piston may be thus reciprocated by means of an air or oil cylinder, or operated intermittently by a hydraulic system driving the machine to be lubricated, or through valving similarly operated, or even manually. Through reciprocation of piston 4, a volume of lubricant under pressure will be directed to the flow reversing valve 1 through line 2, although it will be appreciated that such volume can be supplied by multiple strokes of a smaller pump if desired.

The supply of lubricant is contained within a reservoir 9 and is adapted to flow downwardly into pump chamber 3 through check valve 10 as piston 4 moves to the left (as viewed in Fig. 1). A check valve 11 is provided in line 2 to prevent return of liquid from such line to pump chamber 3 as the piston is reciprocated, except as later explained. A return or relief line 12 leads from flow reversing valve 1 back to the reservoir.

Two parallel lubricant supply lines 13 and 14 lead from the flow reversing valve to valve manifolds such as 15 and 16 from which lubricant discharge lines such as 17 lead to the bearings to be lubricated. Valve manifolds 15 and 16 may be comprised of measuring and dispensing valve units of the general type disclosed in Patent No. 2,016,372. When fluid pressure is applied alternately to lines 13 and 14, with the other line being connected to relief, such dispensing valves are caused to discharge a measured quantity of lubricant to the lines 17. The present invention relates particularly to the flow reversal valve 1 which is automatically operative to effect such alternation of pressure in lines 13 and 14 after all of such dispensing valves have been properly operated. The number of dispensing valves included in the system must be so limited that their combined displacement requirements are less than the delivery of the single stroke pump pressure source or less than the delivery supplied by a smaller multiple stroke pump during any one operating period of predetermined extent.

Figure 2:
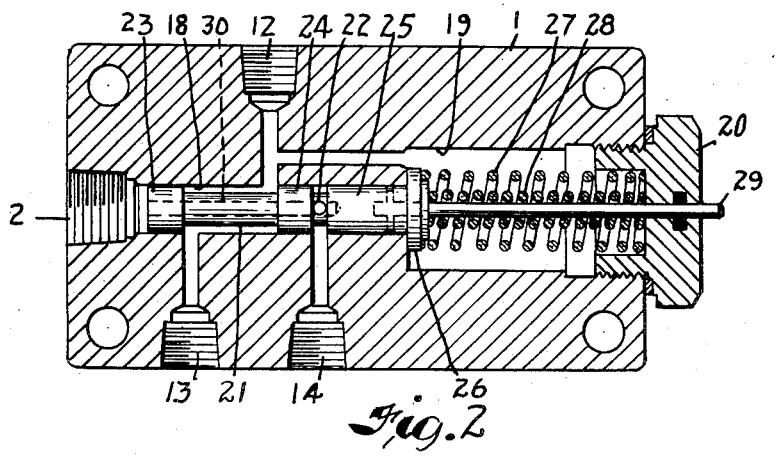
Fig. 2 is a longitudinal sectional view through said valve showing the latter in one operative position.
Figure 3:
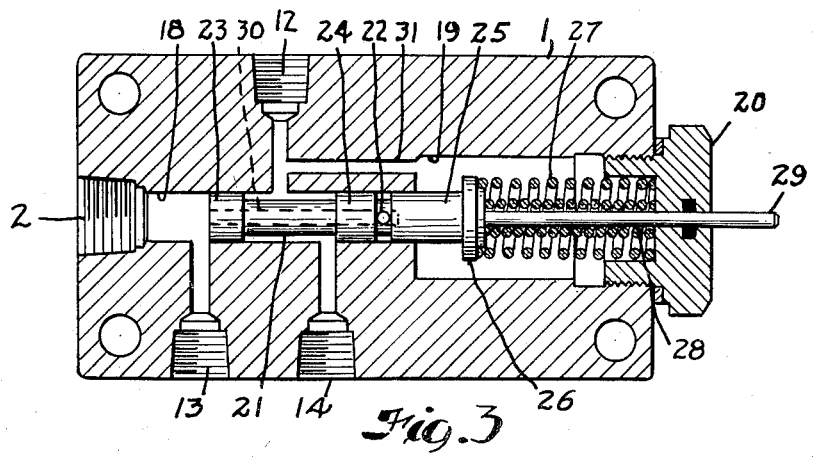
Fig. 3 is a similar longitudinal sectional view showing the same in its other operative position.

Referring now more particularly to Figs. 2 and 3 of the drawing, a cylinder block is bored to provide a cylinder 18 having an enlarged portion counterbored in block 1 at one end to form a chamber 19 closed off by a threaded plug 20. A piston is fitted in cylinder 18, said piston having two reduced portions 21 and 22 leaving shoulders 23, 24 and 25 closely fitting in such cylinder. The piston terminates in a collar 26 which limits reciprocation of the piston to the left as viewed in Figs. 2 and 3 and also serves as an abutment for compression springs 27 and 28 interposed between the same and plug 20 and surrounding center pin 29 which extends through such plug.

A passage 30 extends from the left-hand end of the piston through shouldered portion 23, reduced portion 21, and shouldered portion 24 to reduced portion 22 where it communicates with the annular groove between shoulders 24 and 25. In the normal position of the piston as shown in Fig. 2, it will accordingly be apparent that pump discharge line 2 is in communication with lubricating valve supply line 14. Likewise, it will be apparent that lubricating supply line 13 is connected through the space between shoulders 23 and 24 with relief line 12 leading back to reservoir 9.

Lubricant displaced by the pump through supply line 14 operates the lubricating valves included in manifolds 15 and 16 in one direction, thereby metering lubricant to the connected bearings, and this flow of lubricant continues just so long as the pressure is insufficient to force the reversing valve piston to the right against the opposing force of the springs 27 and 28. It may be noted that although two springs 27 and 28 are indicated to afford the desired resilient action, it is nevertheless feasible to utilize a single spring to produce an equivalent effect. Inasmuch as line 13 is connected to relief as above indicated, the pistons in the lubricating valves included in valve manifolds 15 and 16 are displaced by pressure in line 14 and the lubricant displacement in line 13 caused thereby is accommodated by flow of such lubricant back toward the reservoir through relief line 12.

When all of the lubricating valves have been operated, the pressure in line 2, passage 30 and line 14 will rise sufficiently to force the reversing valve piston to the right against the action of the compression springs as shown in Fig. 3. This movement of the piston continues until the shoulder 23 uncovers the passage leading to line 13 whereupon lubricant enters such line under pressure. At this same time, the shoulder 24 has crossed the passage leading to line 14, thereby relieving such line by connecting the same with relief line 12, and accordingly the lubricating valves are now operated in the opposite direction. The reduced portion 22 of the cylinder has been shifted to a position where it no longer communicates with any passage and there is accordingly no lubricant flow through passage 30.

It will be appreciated from the foregoing that in the original position of the flow reversing valve as shown in Fig. 2, the pressure that can be developed in supply line 14 is governed by the force exerted on the piston by the springs 27 and 28 when they are sufficiently extended to close off line 13 from pump discharge line 2. When the shoulder 23 has, however, been shifted sufficiently to the right to crack the passage leading to line 13 so that lubricant can now enter such latter line, the pressure in cylinder 18 to the left of shoulder 23 will be slightly higher still but due to the throttling action of such shoulder the pressure in supply line 13 will be only that necessary to produce operation of the lubricating valves of manifolds 15 and 16 until their displacement requirements have been met. At that time since the capacity of supply line 13 will have been satisfied, the pressure on the end of the reversing valve piston will rise further, forcing the piston even farther to the right until the reduced portion 22 stands clear of the cylinder and communicates with chamber 19 so that any additional lubricant now supplied from the pump is permitted to escape through passage 30 to chamber 19 and from such latter chamber through passage 31 to relief line 12. This last increment of travel of the reversing valve piston against the action of compression springs 27 and 28 creates a sufficient pressure differential between supply lines 13 and 14 to ensure complete operation of the lubricating valves.

When the pump is no longer forcing lubricant into the flow reversing valve through line 2, springs 27 and 28 tend to return the valve piston to its initial Fig. 2 position. Initial movement of the piston to the left causes shoulder 25 to close off access of passage 30 to chamber 19 and the lubricant entrapped between the piston and check valve 11 in pump discharge line 2 is subjected to the action of such springs. Obviously, further return movement of the piston can be accommodated only by escape of lubricant from such entrapment. Such escape may be provided in a simple manner by utilizing a check valve 11 which is not entirely tight but will permit slow leakage therepast, the excess lubricant escaping into pump chamber 3 when piston 4 is retracted. By limiting the speed of such lubricant escape, the system is rendered operative when used with a small pump which may be operated a sufficient number of times to supply lubricant in the required volume. It is alternatively feasible to introduce a similar delayed return of the piston by making the diameter of the shoulder 25 slightly less than the diameter of the shoulders 23 and 24 to afford slow leakage past the shoulder 25 (in which case excess lubricant entrapped in the left-hand end of cylinder 18 will flow through passage 30 to reduced portion 22, then leak into chamber 19 and flow through passage 31 to relief line 12).

As shown in Fig. 1A, a relief port 32 and a relief line 33 may instead be provided adapted to be opened when piston 4 is fully reciprocated to the left, thereby placing line 2 in communication with the reservoir. Of course, when piston 4 is again reciprocated both port 32 and line 33 are closed so that lubricant will be forced into line 2.

My new hydraulic flow reversing valve and a lubricating system utilizing the same are quite inexpensive and suitable for employment in relatively small installations where automatic and complete lubrication is important but where the expense of prior systems militated against their use. Despite the simplicity of construction and operation of such valve, it is positive and reliable in its action when only a few lubricating valves are required to be served thereby and accordingly there is no very considerable line friction to be overcome.

Other modes of applying the principle of the invention may be employed, change being made as regards the details described, provided the features stated in any of the following claims or the equivalent of such be employed.

I therefore particularly point out and distinctly claim as my invention:

1. In a fluid pressure distributing system including a reservoir, a pump operative intermittently to pump fluid from said reservoir to a discharge pressure line, fluid dispensing valves adapted to be operated by alternately pressurizing two conduits leading thereto, and a pair of fluid conduits leading to said valves and adapted to be alternately pressurized to operate said valves; a flow reversing valve operative selectively to connect each of said conduits alternately to said discharge pressure line and to reservoir comprising a block drilled to provide a valve cylinder having an enlarged end portion forming a chamber, a plug closing the outer end of said chamber, a piston fitted for reciprocation in said cylinder, said piston having three shoulders fitting said cylinder with reduced portions therebetween, said discharge pressure line communicating with the end of said cylinder opposite to that merging with said chamber, resilient means in said chamber urging said piston toward said pressure line end, said conduits communicating with the side of said cylinder at spaced points longitudinally thereof and spaced from said chamber and pressure line ends of said cylinder, stop means normally limiting reciprocation of said piston in said cylinder under influence of said resilient means with one said shoulder intermediate said pressure line end of said cylinder and the adjacent said conduit, a second said shoulder intermediate said two conduits, and the third said shoulder intermediate said chamber and the conduit adjacent thereto, said piston having a passage extending therethrough from its pressure line end to said reduced portion intermediate said shoulders on each side of said conduit adjacent said chamber to place said pressure line in communication with said latter conduit, a relief line leading to reservoir from said cylinder between said shoulder intermediate said pressure line end and the adjacent conduit and said shoulder intermediate said two conduits and closely adjacent the latter said shoulder, and a passage leading from said chamber to said relief line; whereby when said dispensing valves have been fully served and pressure builds up in said conduit adjacent said chamber, pressure in said discharge line then becomes effective to shift said piston against the action of said resilient means and thereby place said discharge line in direct communication with said other conduit while connecting the conduit adjacent said chamber with said relief line, thereby operating said dispensing valves again, and when further pressure consequently builds up in said discharge line said piston is shifted still further to place said discharge line in communication with said chamber through said passage in said piston to permit further pump discharge to be directed back to the reservoir through said relief line, and when operation of said pump ceases said piston is again reciprocated in said cylinder by said resilient means to the extent permitted by said stop means, seepage past the piston permitting gradual escape of fluid in the discharge line end of said cylinder.

2. The system of claim 1, including a check valve in said discharge pressure line adapted to allow slow seepage therepast.

3. In a fluid pressure distributing system including a reservoir, a pump operative intermittently to pump fluid from said reservoir to a discharge pressure line, fluid dispensing valves adapted to be operated by alternately pressurizing two conduits leading thereto, and a pair of fluid conduits leading to said valves and adapted to be alternately pressurized to operate said valves; a flow reversing valve operative selectively to connect each of said conduits alternately to said discharge pressure line and to reservoir comprising a block drilled to provide a valve cylinder having an enlarged end portion forming a chamber, a plug closing the outer end of said chamber, a piston fitted for reciprocation in said cylinder, said piston having three shoulders fitting said cylinder with reduced portions therebetween, said discharge pressure line communicating with the end of said cylinder opposite to that merging with said chamber, resilient means in said chamber urging said piston toward said pressure line end, said conduits communicating with the side of said cylinder at spaced points longitudinally thereof and spaced from said chamber and pressure line ends of said cylinder, stop means normally limiting reciprocation of said piston in said cylinder under influence of said resilient means with one said shoulder intermediate said pressure line end of said cylinder and the adjacent said conduit, a second said shoulder intermediate said two conduits, and the third said shoulder intermediate said chamber and the conduit adjacent thereto, said piston having a passage extending therethrough from its pressure line end to said reduced portion intermediate said shoulders on each side of said conduit adjacent said chamber to place said pressure line in communication with said latter conduit, a relief line leading to reservoir from said cylinder between said shoulder intermediate said pressure line end and the adjacent conduit and said shoulder intermediate said two conduits and closely adjacent the latter said shoulder, a passage leading from said chamber to said relief line, a check valve in said discharge line, and a by-pass around said check valve adapted to be valved to reservoir by the return stroke of said pump; whereby when said dispensing valves have been fully served and pressure builds up in said conduit adjacent said chamber pressure in said discharge line then becomes effective to shift said piston against the action of said resilient means and thereby place said discharge line in direct communication with said other conduit while connecting the conduit adjacent said chamber with said relief line, thereby operating said dispensing valves again, and when further pressure consequently builds up in said discharge line said piston is shifted still further to place said discharge line in communication with said chamber through said passage in said piston to permit further pump discharge to be directed back to the reservoir through said relief line, and when operation of said pump ceases said piston is again reciprocated in said cylinder by said resilient means to the extent permitted by said stop means, fluid in the discharge line end of said cylinder escaping through said by-pass.

4. In a fluid distributing system including a reservoir, a pump cylinder, a fluid discharge line leading from one end of said cylinder, a fluid inlet to said cylinder from said reservoir adjacent the discharge end of the latter, a check valve in said inlet to prevent return flow to said reservoir, a pump piston in said cylinder, means operative to reciprocate said piston, fluid dispensing valves adapted to be operated by alternately pressurizing two conduits leading thereto, and a pair of fluid conduits leading to said valves and adapted to be alternately pressurized to operate said valves; a flow reversing valve operative selectively to connect each of said conduits alternately to said discharge pressure line and to reservoir comprising a block drilled to provide a valve cylinder having an enlarged end portion forming a chamber, a plug closing the outer end of said chamber, a valve piston fitted for reciprocation in said valve cylinder, said valve piston having three shoulders fitting said valve cylinder with reduced portions therebetween, said discharge pressure line communicating with the end of said valve cylinder opposite to that merging with said chamber, resilient means in said chamber urging said valve piston toward said pressure line end, said conduits communicating with the side of said valve cylinder at spaced points longitudinally thereof and spaced from said chamber and pressure line ends of said valve cylinder, stop means normally limiting reciprocation of said valve piston in said valve cylinder under influence of said resilient means with one said shoulder intermediate said pressure line end of said valve cylinder and the adjacent said conduit, a second said shoulder intermediate said two conduits, and the third said shoulder intermediate said chamber and the conduit adjacent thereto, said valve piston having a passage extending therethrough from its pressure line end to said reduced portion intermediate said shoulders on each side of said conduit adjacent said chamber to place said pressure line in communication with said latter conduit, a relief line leading to reservoir from said valve cylinder between said shoulder intermediate said pressure line end and the adjacent conduit and said shoulder intermediate said two conduits and closely adjacent the latter said shoulder, a passage leading from said chamber to said relief line, a check valve in said discharge line, a by-pass around said latter check valve leading from said discharge line to said pump cylinder at a point spaced substantially from the discharge end of said pump cylinder, and a relief passage leading to reservoir from said pump cylinder similarly substantially spaced from the discharge end of the latter; whereby when said dispensing valves have been fully served and pressure builds up in said conduit adjacent said chamber pressure in said discharge line then becomes effective to shift said valve piston against the action of said resilient means and thereby place said discharge line in direct communication with said other conduit while connecting the conduit adjacent said chamber with said relief line, thereby operating said dispensing valves again, and when further pressure consequently builds up in said discharge line said valve piston is shifted still further to place said discharge line in communication with said chamber through said passage in said valve piston to permit further pump discharge to be directed back to the reservoir through said relief line, and when operation of said pump ceases said valve piston is again reciprocated in said valve cylinder by said resilient means to the extent permitted by said stop means, fluid in the discharge line end of said valve cylinder escaping through said by-pass.

5. A flow reversing valve comprising a cylinder, a piston fitted for reciprocation in said cylinder, said piston having three shoulders fitting said cylinder with reduced portions therebetween, a fluid pressure inlet to one end of said cylinder, an outlet to relief communicating with the other end of said cylinder, three longitudinally spaced ports in said cylinder intermediate said inlet and outlet, the middle port of said three ports being adapted to be connected to relief, stop means limiting reciprocation of said piston toward the inlet end of said cylinder with one shoulder interposed between said inlet and said first adjacent port, the central shoulder interposed between said middle port and said port adjacent said outlet, and the third shoulder interposed between said latter port and said outlet, leaving said first port and said middle port in communication, resilient means normally urging said piston into such position determined by said stop means, and a passage through said piston from the inlet end of said cylinder to the reduced portion between said central shoulder and said third shoulder and thereby normally communicating with said port adjacent said outlet, whereby said piston may be shifted to place said inlet in communication with said first port and said port adjacent said outlet in communication with said middle port, and also further shifted to place said inlet in communication with said outlet through said passage in said piston.

6. A flow reversing valve comprising a block, a cylinder formed in said block, a piston fitted for reciprocation in said cylinder, said piston having three shoulders fitting said cylinder with reduced portions therebetween, a fluid pressure inlet to one end of said cylinder, an enlarged outlet chamber in said block into which the other end of said cylinder opens, three longitudinally spaced ports in said cylinder intermediate said inlet and outlet chamber, the middle port of said three ports being adapted to be connected to relief, stop means limiting reciprocation of said piston toward the inlet end of said cylinder with one shoulder interposed between said inlet and said first adjacent port, the central shoulder interposed between said middle port and said port adjacent said outlet chamber, and the third shoulder interposed between said latter port and said outlet chamber, leaving said first port and said middle port in communication, resilient means in said chamber normally urging said piston into such position determined by said stop means, a passage in said block from said outlet chamber communicating with said middle port adapted to be connected to relief, and a passage through said piston from the inlet end of said cylinder to the reduced portion between said central shoulder and said third shoulder and thereby normally communicating with said port adjacent said outlet chamber, whereby said piston may be shifted to place said inlet in communication with said first port and said port adjacent said outlet chamber in communication with said middle port, and also further shifted to place said inlet in communication with said outlet chamber through said passage in said piston.

7. A valve comprising a cylinder, a valve piston fitted for reciprocation therein, a port communicating with each end of said cylinder, three longitudinally spaced ports in the side of said cylinder intermediate said end ports, three shoulders on said piston fitting said cylinder with reduced portions therebetween, and a passage extending longitudinally within said piston from one end thereof to the said reduced portion further spaced from such end, said shoulders being spaced relative to said ports to place two adjacent said side ports in communication through the clearance afforded by a said reduced portion while the third said side port is in communication with one said end port through such passage.

8. The valve of claim 7, including means normally urging said piston toward said last-named end port.

9. The valve of claim 7, wherein said end port adjacent said reduced portion of said piston to which said passage leads is positioned to communicate with the clearance surrounding said latter reduced portion when said piston is sufficiently reciprocated.

10. The valve of claim 7, including means normally urging said piston toward said last-named end port, and wherein said end port adjacent said reduced portion of said piston to which said passage leads is positioned to communicate with the clearance surrounding said latter reduced portion when said piston is sufficiently reciprocated.

11. The valve of claim 7, wherein said shoulders are spaced so that when said piston is reciprocated to place said last-named end port in direct communication with the first adjacent said side port, said other two side ports will be placed in communication with each other through the clearance surrounding said reduced portion with which said passage does not communicate, and the clearance about said reduced portion with which said passage does communicate is closed by the cylinder wall.

12. The valve of claim 7, wherein said shoulders are spaced so that when said piston is reciprocated to place said last-named end port in direct communication with the first adjacent said side port, said other two side ports will be placed in communication with each other through the clearance surrounding said reduced portion with which said passage does not communicate, and the clearance about said reduced portion with which said passage does communicate is closed by the cylinder wall; and further reciprocation of said piston in the same direction maintains said ports in communication as indicated but also shifts the reduced portion of said piston with which said passage communicates to a position communicating with said end port most nearly adjacent said latter reduced portion.

13. A valve comprising a cylinder, a valve piston fitted for reciprocation therein, a port communicating with an end of said cylinder, three longitudinally spaced ports in the side of said cylinder beyond said end port, three shoulders on said piston fitting said cylinder with reduced portions therebetween, and a passage extending longitudinally within said piston from the end adjacent said end port to said reduced portion further spaced from such end to place said end port and the clearance about said latter reduced portion in communication, said shoulders being spaced relative to said ports to place two adjacent said side ports in communication through the clearance afforded by a said reduced portion while the third said side port is in communication with said end port through the clearance afforded by said other reduced portion and said passage.

References Cited in the file of this patent

UNITED STATES PATENTS

| | | |
|---|---|---|
| 1,780,471 | Galloway | Nov. 4, 1930 |
| 2,635,710 | Tear | Apr. 21, 1953 |